(12) United States Patent
Hu

(10) Patent No.: US 7,753,336 B2
(45) Date of Patent: Jul. 13, 2010

(54) ADJUSTABLE EXTENDING STAND FOR PANEL DISPLAYS

(75) Inventor: Chi-Lung Hu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 266 days.

(21) Appl. No.: 12/119,550

(22) Filed: May 13, 2008

(65) Prior Publication Data
US 2009/0283654 A1 Nov. 19, 2009

(51) Int. Cl.
*A47G 29/00* (2006.01)
*F16M 11/00* (2006.01)

(52) U.S. Cl. ............... 248/688; 248/685; 248/474; 248/188.8

(58) Field of Classification Search .......... 248/469, 248/472, 474, 476, 477, 478, 673, 677, 688, 248/685; 40/748, 749, 761, 762
See application file for complete search history.

(56) References Cited

U.S. PATENT DOCUMENTS

| | | | | |
|---|---|---|---|---|
| 253,457 A | * | 2/1882 | Wiederer | ............ 248/471 |
| 5,823,504 A | * | 10/1998 | Kuwajima | ............ 248/685 |
| 7,301,759 B2 | * | 11/2007 | Hsiung | ............ 361/679.27 |
| 7,364,126 B2 | * | 4/2008 | Tsai et al. | ............ 248/188.8 |
| 7,467,773 B2 | * | 12/2008 | Ogawa et al. | ............ 248/472 |

* cited by examiner

*Primary Examiner*—Gwendolyn Baxter
(74) *Attorney, Agent, or Firm*—Rabin & Berdo, P.C.

(57) ABSTRACT

An adjustable extending stand for panel displays has a body, a sliding panel and multiple positioning devices. The body has a proximal end pivotally mounted to a panel display, a distal end and two mounting slots formed oppositely in the body. The sliding panel is slidably mounted between the mounting slots of the body and has a distal end selective protruding telescopically from the distal end of the body to abut a plane. The positioning devices are mounted securely in corresponding mounting slots and controllably engage the sliding panel to hold the sliding panel in a determined position relative to the body. Accordingly, a length of the adjustable extending stand may be adjusted by changing a position of the sliding panel relative to the body thereby conveniently adjusting an angle of the panel display or allowing different sized panels to be displayed conveniently.

4 Claims, 5 Drawing Sheets

ADJUSTABLE EXTENDING STAND FOR PANEL DISPLAYS

BACKGROUND OF THE INVENTION

1. Field of the Invention

The present invention relates to an adjustable extending stand for panel displays, and more particularly to an adjustable extending stand for panel displays that may be implemented on panel displays of various size and style, is convenient and has a simple structure.

2. Description of Related Art

Progression of technology has created various electronic products with multitudes of functions including notebooks, panel displays and smart phones. A panel display may be implemented as a computer monitor, television, digital photo frame, touch panel or the like and is mounted with a stand that supports the weight of the panel display and allows the panel display to be held securely and stably on a determined plane.

However, for panel displays in different sizes or styles, the stand must be designed to the panel display mounted therewith. Otherwise, since the lengths of conventional stands for panel displays are preset, adjusting an angle of the panel display is awkward.

SUMMARY OF THE INVENTION

The main objective of the present invention is to provide an adjustable extending stand for panel displays that can be implemented on panel displays of different sizes and styles, is convenient and has a simple structure.

To achieve the objective, the adjustable extending stand for panel displays comprises a body, a sliding panel and multiple positioning devices.

The body has a proximal end pivotally mounted to a panel display, a distal end and two mounting slots formed oppositely in the body.

The sliding panel is slidably mounted between the mounting slots of the body and has a distal end selectively protruding telescopically from the distal end of the body to abut a plane.

The positioning devices are mounted securely in corresponding mounting slots and controllably engage the sliding panel to hold the sliding panel in a determined position relative to the body.

Accordingly, a length of the adjustable extending stand may be adjusted by changing a position of the sliding panel relative to the body thereby conveniently adjusting an angle of the panel display or allowing different sized panels to be displayed conveniently.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
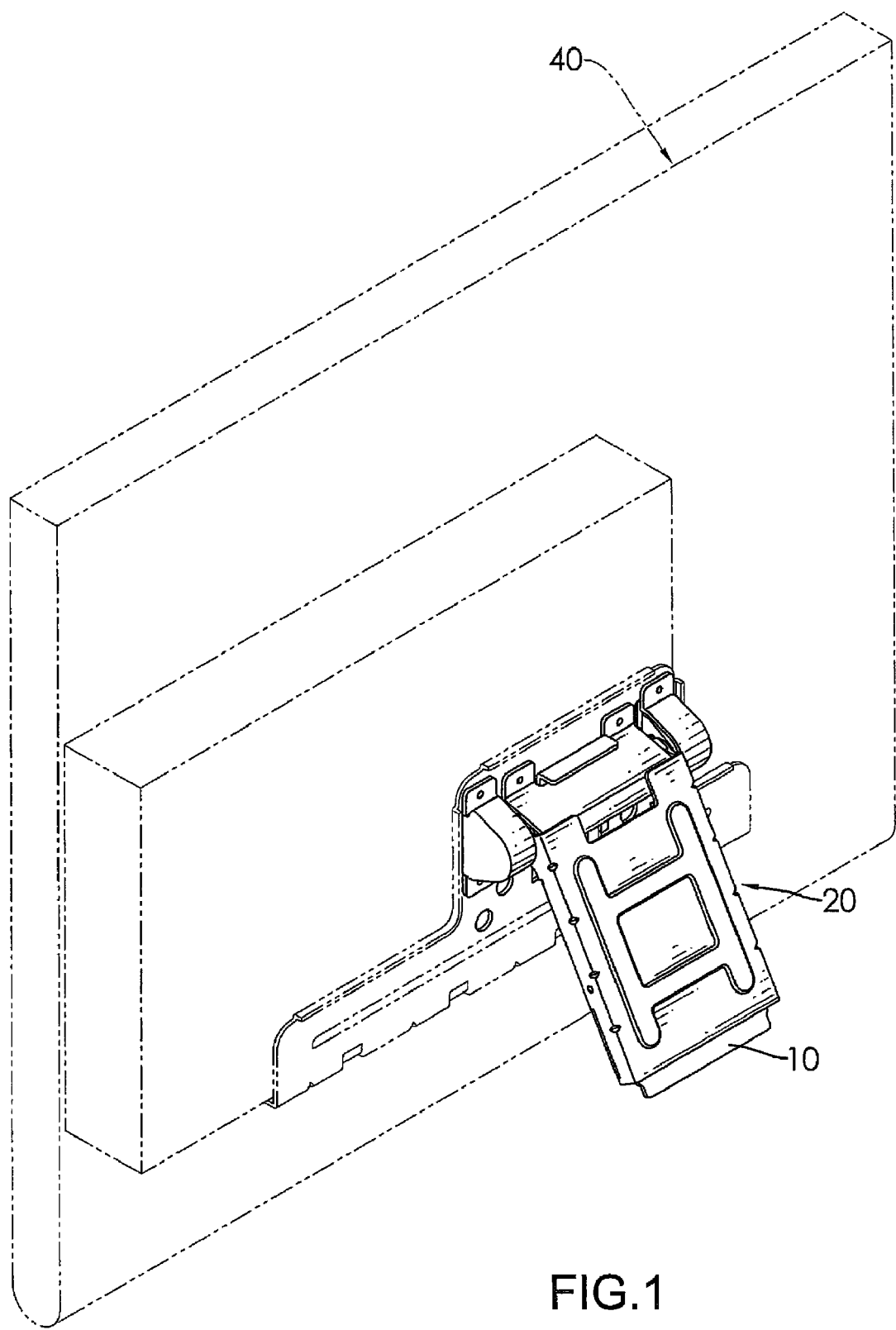
FIG. 1 is a perspective view of an adjustable extending stand in accordance with the present invention, shown mounted with a panel display.
Figure 2:
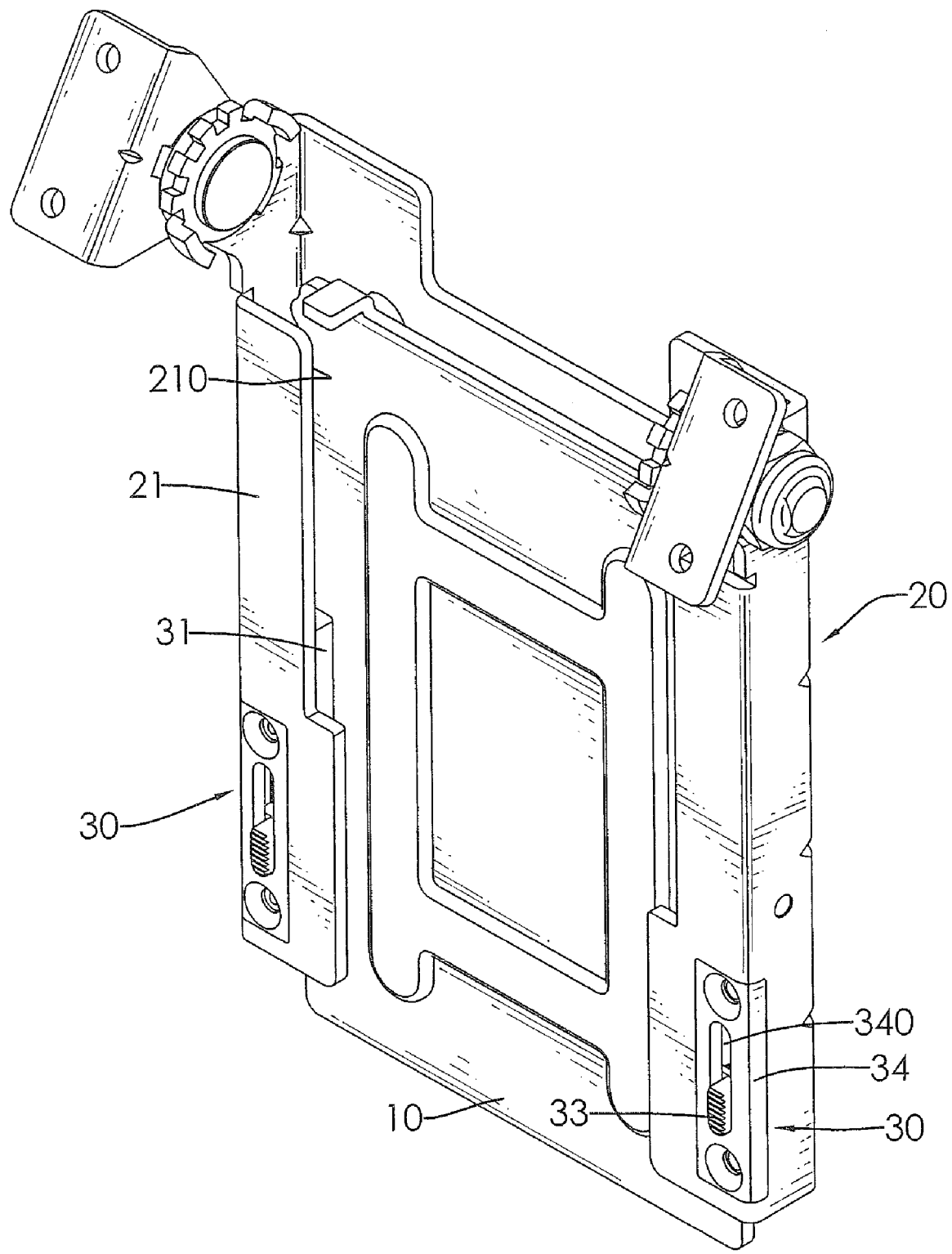
FIG. 2 is a perspective view of the adjustable extending stand in FIG. 1.
Figure 3:
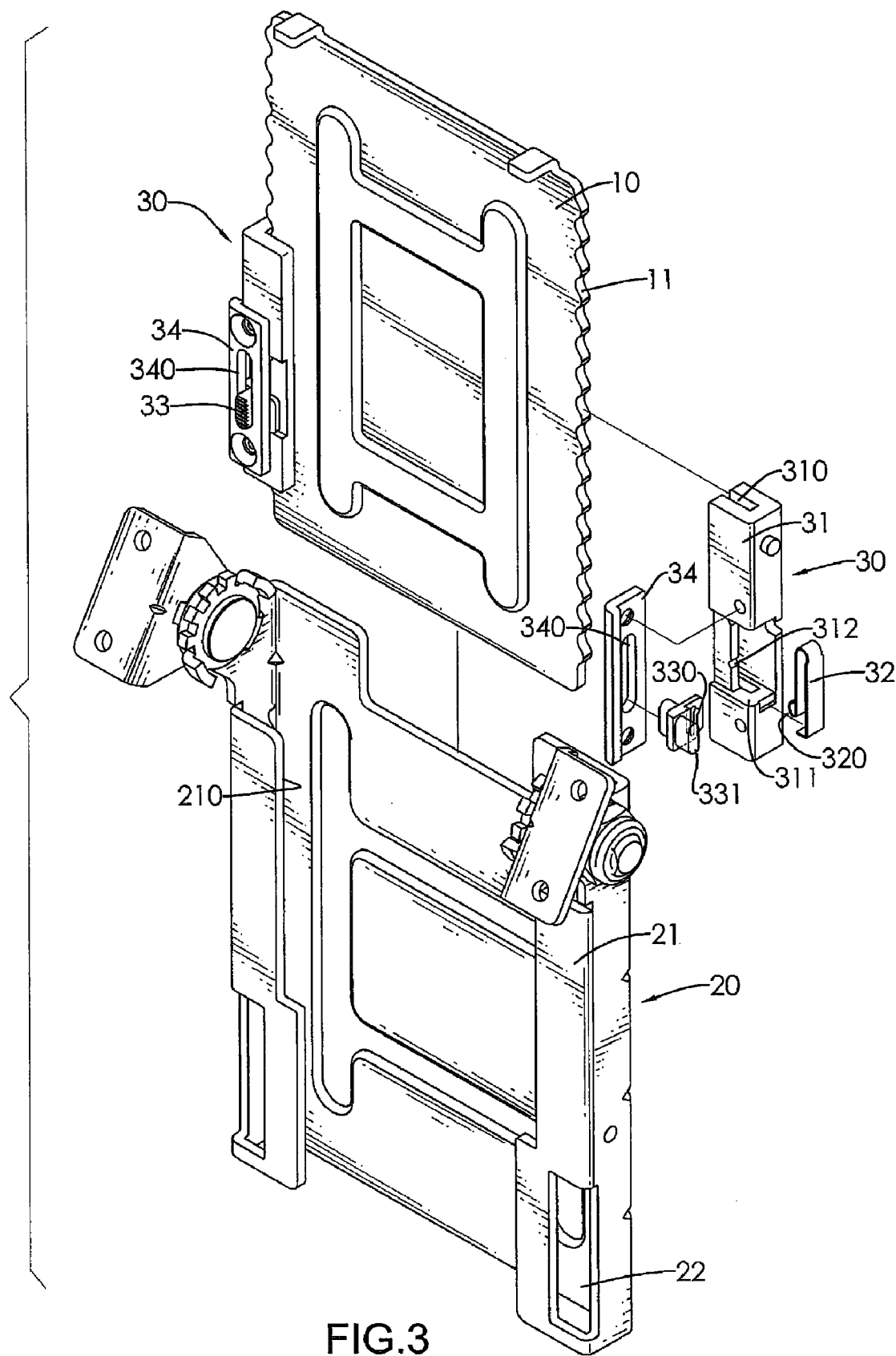
FIG. 3 is an exploded perspective view of the adjustable extending stand in FIG. 1.

With reference to FIGS. 1, 2 and 3, an adjustable extending stand in accordance with present invention is mounted onto a back of a digital photo frame (40) and comprises a body (20), a sliding panel (10) and two positioning devices (30).

The body (20) has a proximal end, a distal end, two sides and two side tabs (21). The proximal end of the body (20) is pivotally mounted on the panel display. The side tabs (21) are formed separately along the two sides, each side tab (21) may be "U" shaped in cross section and defines a longitudinal mounting slot (210) opposite to the mounting slot (210) of the other side tab (21) and each side tab (21) has a cutout (22) near the distal end of the body (20).

The sliding panel (10) has two sides and a distal end. The sides of the sliding panel (10) are slidably mounted respectively in the mounting slots (210) of the body (20), and each side of the sliding panel (10) has multiple recesses (11) formed thereon. The distal end selectively protrudes telescopically from the distal end of the body (20) to abut a plane.

Figure 4:
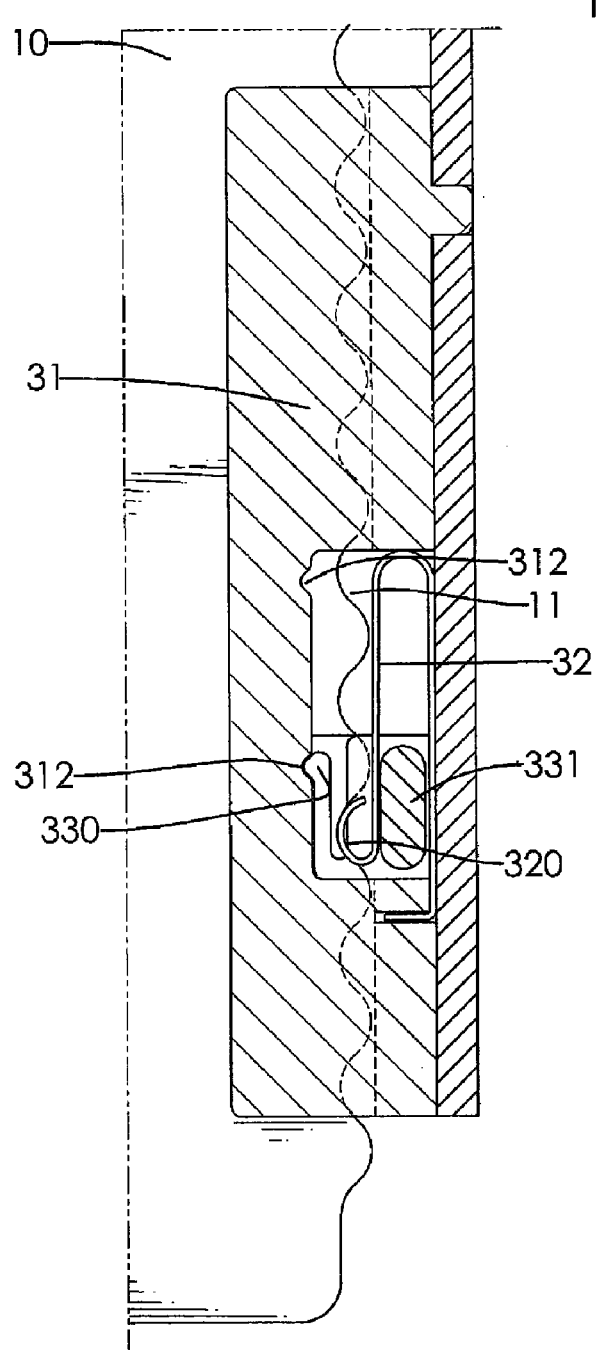
FIG. 4 is an operational side view in partial section of the adjustable extending stand in FIG. 1, shown fixed.
Figure 5:
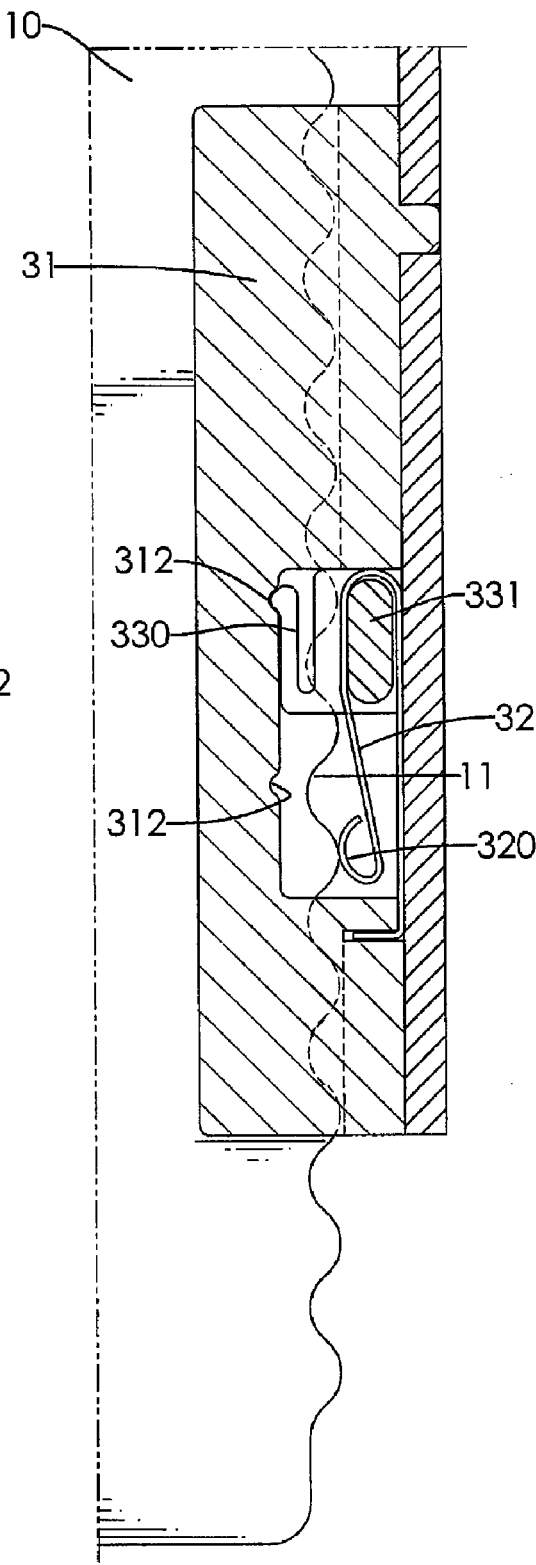
FIG. 5 is an operational side view in partial section of the adjustable extending stand in FIG. 1, shown moving.

With further reference to FIGS. 4 and 5, the positioning devices (30) are securely mounted respectively in the mounting slots (210) of the body (20), each positioning device (30) comprises a base (31), a cap (34), a resilient element (32) and a switch (33).

The base (31) is securely mounted in the mounting slot (210) of the corresponding side tab (21) and has a sliding gap (310) and an opening (311). The sliding gap (310) is longitudinally formed in a side of the base (31), communicates with the mounting slot (210) and is mounted slidably around a corresponding side of the sliding panel (10). The opening (311) is defined in a middle portion of the base (31) corresponding to the cutout (22) of a corresponding side tab (21) of the body (20) and defines a side wall having two notches (312). The notches (312) are separately formed in the side wall of the opening (311).

The cap (34) is mounted in the cutout (22) of the corresponding side tab (21) of the body (20), covers the opening (311) and has an elongated hole (340) formed therethrough and communicating with the opening (311) of the base (31).

The resilient element (32) may be "U" shaped and has a securing end being mounted securely in the base (31), and a free end being disposed in the opening (311) of the base (31) and having a protrusion (320) that selectively engages one of the recesses (11) of the sliding panel (10) to hold the sliding panel (10) in position.

The switch (33) is disposed in the opening (311) of the base (31) and comprises a top, a bottom, a knob, a boss (331) and a detent (330). The knob is formed in the top of the switch (33), extends through and is slidably mounted in the elongated hole (340) of the cap (34), thereby allowing the switch (33) to move between a locking position and an unlocking position. The boss (331) is formed in the bottom of the switch (33) and selectively abuts the free end of the resilient element (32) when the switch (33) is in the locking position, thereby ensuring the protrusion (320) of the resilient element (32) engages a corresponding recess (11) of the sliding panel (10). The detent (330) is formed on the boss (331) and has a resilient arm selectively engaging one of the notches (312) of the base (31) to alternatively hold the switch (33) in the locking position and the unlocking position.

Figures 6, 7:
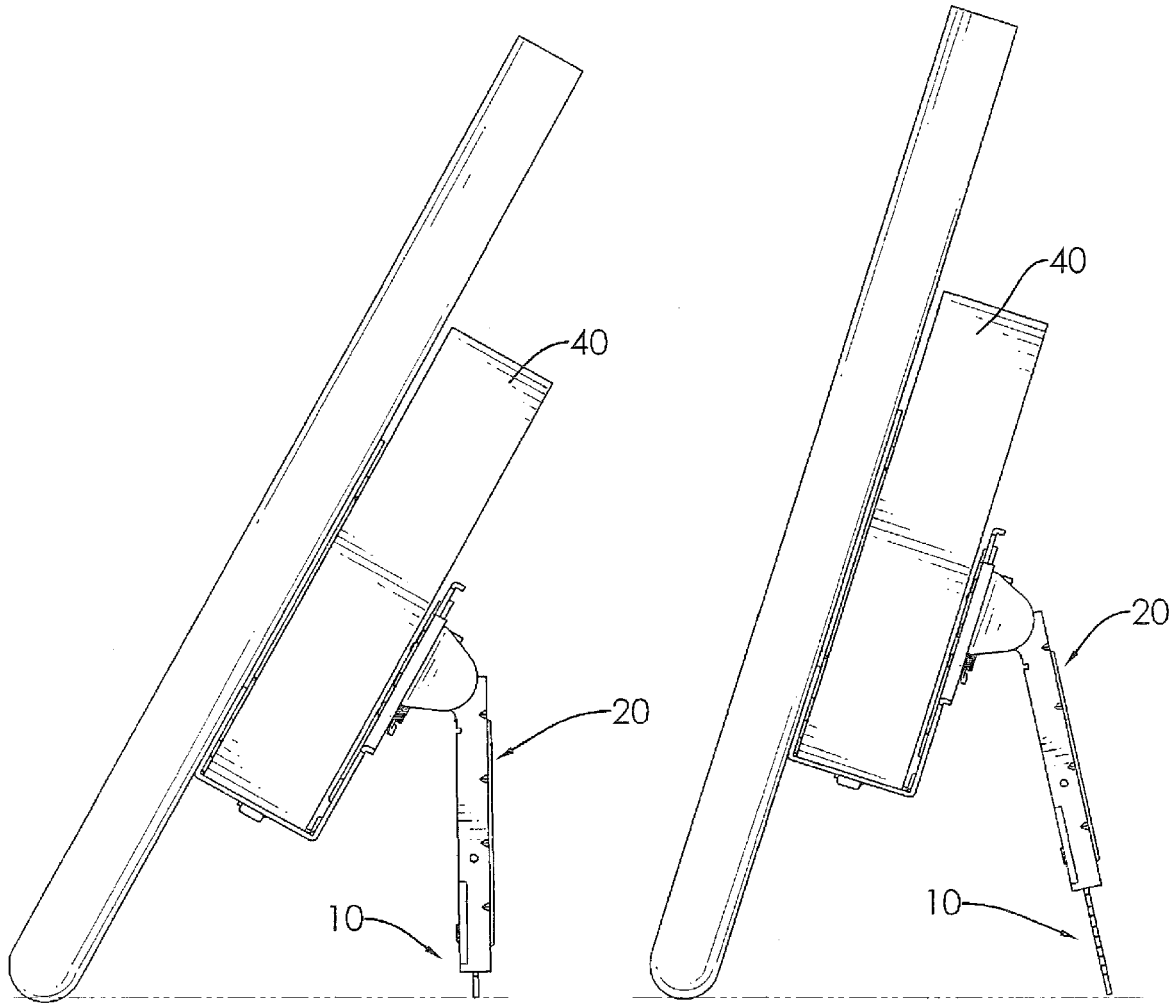
FIG. 6 is an operational side view of the adjustable extending stand, shown retracted.
FIG. 7 is an operational side view of the adjustable extending stand, shown extended.

With further reference to FIGS. 6 and 7, when adjusting a length of the adjustable extending stand, the knob is pushed to move the switch (33) to the unlocking position then the sliding panel (10) is extended or retracted relative to the body (20). Finally, the switch (33) is moved to the locking position to hold the sliding panel (10) in a determined position due to the engagement between the protrusion (320) of the resilient element (32) and the corresponding recess (11) of the sliding panel (10).

Accordingly, the adjustable extending stand in accordance with present invention allows easy adjustment of a length and therefore accommodates panel displays of different sizes or styles as well as allowing adjustment of an angle of the panel display.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. An adjustable extending stand for panel displays comprising
   a body having
      a proximal end adapted for being pivotally mounted on the panel display;
      a distal end;
      two sides; and
      two side tabs being formed separately along the two sides, each side tab defining a longitudinal mounting slot opposite to the mounting slot of the other side tab and each side tab having a cutout near the distal end of the body;
   a sliding panel having
      two sides of the sliding panel being slidably mounted respectively in the mounting slots of the body, and each side of the sliding panel having multiple recesses formed thereon; and
      a distal end selectively protruding telescopically from the distal end of the body; and
   two positioning devices being securely mounted respectively in the mounting slots of the side tabs of the body, each positioning device comprising
      a base being securely mounted in a corresponding mounting slot of the body and having
         a sliding gap being longitudinally formed in a side of the base, communicating with the corresponding mounting slot and being mounted slidably around a corresponding side of the sliding panel;
         an opening being defined in a middle portion of the base and corresponding to the cutout of a corresponding side tab of the body; and
      a cap being mounted in the cutout of the corresponding side tab of the body, covering the opening of the base and having an elongated hole formed therethrough and communicating with the opening of the base;
      a resilient element having
         a securing end being mounted securely in the base; and
         a free end being disposed in the opening of the base and having a protrusion selectively engaging one of the recesses of the sliding panel and holding the sliding panel in position; and
      a switch being disposed in the opening of the base and comprising
         a top;
         a bottom;
         a knob being formed in the top of the switch and extending through and being slidably mounted in the elongated hole of the cap, thereby allowing the switch to move between a locking position and an unlocking position; and
         a boss being formed in the bottom of the switch and selectively abutting the free end of the resilient element thereby ensuring the protrusion of the resilient element engages a corresponding recess of the sliding panel.

2. The adjustable extending stand as claimed in claim 1, wherein
   the opening of the base of each positioning device further defines a side wall having two notches being separately formed in the side wall; and
   the switch of each positioning device further has a detent being formed on the boss and having a resilient arm selectively engaging one of the notches of a corresponding base to alternatively hold the switch in the locking position and the unlocking position.

3. The adjustable extending stand as claimed in claim 1, wherein each side tab of the body is "U" shaped in cross section.

4. The adjustable extending stand as claimed in claim 1, wherein the resilient element of each positioning device is "U" shaped.

* * * * *